April 4, 1939.    K. ROSS    2,153,027
SUBDUED MELODY PHONOGRAPH AND ACCOMPANIMENT RECORD
Filed Aug. 19, 1937
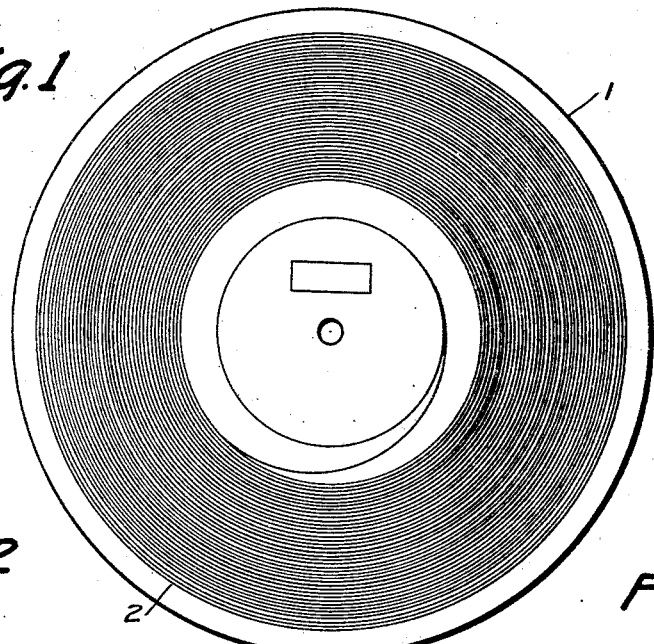
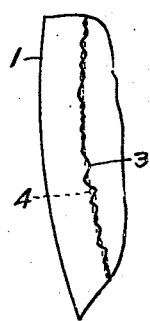
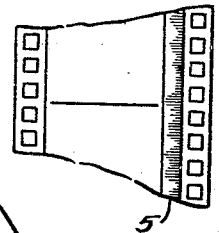
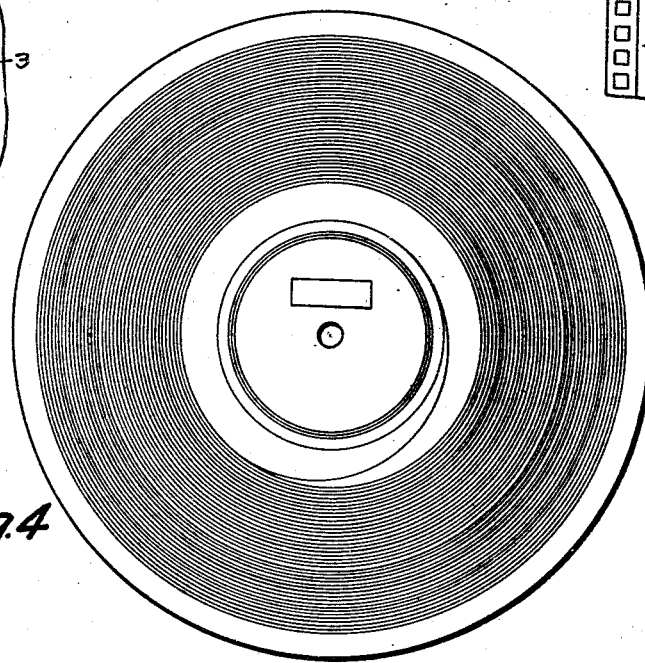
INVENTOR.
King Ross
BY James Harrison Bowen
ATTORNEY.

Patented Apr. 4, 1939

2,153,027

UNITED STATES PATENT OFFICE 2,153,027

SUBDUED MELODY PHONOGRAPH AND ACCOMPANIMENT RECORD

King Ross, Jackson Heights, Long Island, N. Y.

Application August 19, 1937, Serial No. 159,938

1 Claim. (Cl. 84—470)

The purpose of this invention is to provide means by which a musician, music student, soloist, or other musical person may obtain accompaniment to a solo, musical composition, or the like.

The invention is a phonograph disc or other sound record upon which the melody is recorded at a lower sound level than the accompaniment, or other parts of the composition.

It will be appreciated that present day sound recording technique demands the melody of a musical composition to predominate, and, to this end, the musician or musicians, who play the melody part, either play louder than the accompanying parts, or else they are placed closer to the microphone, so that upon the finished record this melody is unmistakable to the listener. To obtain the proper musical balance, separate microphones are sometimes used into which the melody is played to insure the predomination of the melody.

Should a dance musician, or so-called "hot" or "swing" musician, desire to improvise a chorus using a present day phonograph record as background or accompaniment, the recorded melody line obscures the recorded accompaniment and interferes with his improvised melody.

As is seen, the object of my invention is to provide means by which a "hot" or "swing" dance musician may obtain accompaniment to improvisation, the melody of said accompaniment being subdued or conditioned so that it will not interfere with said improvisation.

A music student or pupil, on any musical instrument, who might select a phonograph record recorded in the accepted manner to play along with, using the record as his accompaniment, would hear the recorded melody over and above the recorded accompaniment. Yet if the melody was not recorded, the student might easily lose his place in the music.

So, as another object, I provide, by my invention, means whereby a music student, vocalist, soloist, or other musician, may obtain musical accompaniment in which the melody is subdued but may still be audible as a guide.

Other features and advantages of the invention will appear from the following description taken in connection with the drawing, wherein:

Figure 1 shows one side of a phonograph record disc indicated by the numeral 1, and numeral 2 indicates grooves in which are recorded a musical composition.

Figure 2 shows an enlarged and exaggerated portion of disc 1, on which is delineated a portion of a single groove 3 as an illustration. The difficulty of depicting, in a drawing, a recorded wave-form in which the melody alone is subdued will be appreciated. However, allowing the heavy line 3 to depict the accompaniment only, the light dotted line 4 shows the subdued melody superimposed upon the accompaniment, the dotted line 4 being additive algebraically to the heavy line 3 to obtain a resultant single groove.

Figure 3 shows a portion of a variable area sound film, the shaded wave-form 5 depicting recorded music in which the melody has been recorded at a relatively lower volume level than its accompaniment.

Without departing from the scope of my invention, I may also record with subdued melody technique upon a wire magnetically, as in the Poulson telegraphone, or I may use the hill-and-dale type of phonograph disc, or cylinder, or I may use the variable density method of sound-on-film recording.

To make a record of my invention, I assemble a group of musicians before a microphone or microphone system in a suitable sound recording studio. The musicians who have parts to play which belong definitely to the accompaniment are placed closer to the microphone than those musicians who play the melody part. The musical balance may best be obtained by listening to the total result through a monitor loud speaker, and moving the melody player or players back from the microphone until the melody is barely discernible, the accompaniment predominating.

When the master record is completed the pressings cannot easily be distinguished visually from any other normally recorded composition, so I provide a label or inscription upon a finished record, designating it as being of the subdued melody type. This label or inscription may also contain information as to the content of the sound recorded, the name of the composition, composer, number of record, etc.

In Figure 4 I have illustrated a record of an alternate type in which a musical composition is recorded with the melody subdued, with time or tempo beats, and a separate tuning frequency, all recorded on one surface.

In Figures 1 and 4 the grooves are shown as concentric, however it may be appreciated that this is a diagrammatic representation, the grooves in the actual product being spiral.

Having thus fully described the invention, what I claim as new, and desire to secure by Letters Patent, is:

A practice sound record, to the musical recording on which, a melody is to be added by a performer as such musical recording is reproduced, comprising a record body having uninterruptedly recorded thereon, in such volume as to be audible along with the melody supplied by said performer, the bass and harmony of a musical composition, and the melody of said musical composition only faintly recorded thereon, said melody being audible only to one relatively close to the reproducing machine and inaudible when the melody is added by the performer.

KING ROSS.